（12）United States Patent
Lee et al.

(10) Patent No.: US 9,136,076 B2
(45) Date of Patent: Sep. 15, 2015

(54) MECHANICALLY OPERATED CELL SWITCH OF VACUUM CIRCUIT BREAKER

(71) Applicant: LSIS CO., LTD., Anyang-si, Gyeonggi-do (KR)

(72) Inventors: Jae Yong Lee, Chungcheongbuk-do (KR); Keun Eui Kim, Daejeon (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 25 days.

(21) Appl. No.: 14/053,385

(22) Filed: Oct. 14, 2013

(65) Prior Publication Data

US 2014/0116987 A1    May 1, 2014

(30) Foreign Application Priority Data

Oct. 30, 2012 (KR) .................. 10- 2012-0121512

(51) Int. Cl.
| | |
|---|---|
| *H01H 3/42* | (2006.01) |
| *H01H 33/40* | (2006.01) |
| *H01H 3/16* | (2006.01) |
| *H01H 9/00* | (2006.01) |

(52) U.S. Cl.
CPC .............. *H01H 33/40* (2013.01); *H01H 3/16* (2013.01); *H01H 9/0066* (2013.01)

(58) Field of Classification Search
CPC ..... H01H 33/40; H01H 33/42; H01H 33/666; H01H 3/3015; H01H 3/42; H01H 3/46
USPC .......... 218/4, 78, 120, 154; 335/38, 267, 276
See application file for complete search history.

(56) References Cited

U.S. PATENT DOCUMENTS 3,639,865 A    2/1972  Takeda et al.
4,293,834 A *  10/1981 Date et al. .................. 335/76
4,562,419 A *  12/1985 Preuss et al. ............... 335/195
(Continued)

FOREIGN PATENT DOCUMENTS

CN    1357902    7/2002
CN    102117711  7/2011
(Continued)

OTHER PUBLICATIONS

European Patent Office Application Serial No. 13188746.5, Search Report dated Feb. 4, 2014, 7 pages.
The State Intellectual Property Office of the People's Republic of China Application Serial No. 201310526971.5, Office Action dated May 4, 2015, 6 pages.

*Primary Examiner* — Truc Nguyen
(74) *Attorney, Agent, or Firm* — Lee, Hong, Degerman, Kang & Waimey

(57) ABSTRACT

There is provided a mechanically operated cell (MOC) switch of a vacuum circuit breaker, which is uniformly operated regardless of an insertion stroke of a push rod that operates a MOC switch of a vacuum circuit breaker. The MOC switch outputting an ON/OFF state of a vacuum circuit breaker when the vacuum circuit breaker operates includes: a main bracket; a rotational shaft installed in the main bracket; a connection lever rotatably coupled to the rotational shaft and having one end connected to an auxiliary switch; a roller coupled to the other end of the connection lever; and a horizontal moving unit installed in a portion of the to main bracket and making a horizontal movement to rotate the roller and allowing the other end of the connection lever to make an ascending and descending movement.

6 Claims, 7 Drawing Sheets

(56) References Cited

U.S. PATENT DOCUMENTS

| | | | |
|---|---|---|---|
| 4,743,876 A * | 5/1988 | Milianowicz et al. | 335/20 |
| 5,635,690 A * | 6/1997 | Knecht et al. | 200/51.09 |
| 6,759,617 B2 * | 7/2004 | Yoon | 218/153 |
| 7,973,622 B2 * | 7/2011 | Yang et al. | 335/13 |
| 8,198,557 B2 | 6/2012 | Lee et al. | 200/50.21 |
| 2008/0129429 A1 * | 6/2008 | Ricciuti et al. | 335/38 |
| 2009/0051470 A1 | 2/2009 | Yang et al. | |

FOREIGN PATENT DOCUMENTS

| | | |
|---|---|---|
| DE | 2106084 | 8/1971 |
| EP | 1128409 | 8/2001 |
| KR | 2001-0036566 | 5/2001 |

* cited by examiner

MECHANICALLY OPERATED CELL SWITCH OF VACUUM CIRCUIT BREAKER

CROSS-REFERENCE TO RELATED APPLICATION

Pursuant to 35 U.S.C. §119(a), this application claims the benefit of earlier filing date and right of priority to Korean Application No. 10-2012-0121512, filed on Oct. 30, 2012, the contents of which is incorporated by reference herein in its entirety.

BACKGROUND OF THE INVENTION

1. Field of the Invention

The present disclosure relates to a mechanically operated cell (MOC) switch, and more particularly, to a MOC switch of a vacuum circuit breaker, which is uniformly operated regardless of an insertion stroke (or an operation distance) of a push rod that operates a MOC switch of a vacuum circuit breaker.

2. Background of the Invention

In general, a vacuum circuit breaker is a circuit breaker installed in a high voltage electric power system to break a circuit to protect the electric power system in the event of a dangerous situation such as a short circuit, an overcurrent, and the like, and it is designed by utilizing excellent insulating performance and arc extinguishment capability in a vacuum state.

A vacuum circuit breaker is constructed in a distributing board in which various electric equipment is installed and managed to operate or control a power plant, an electric power substation, or the like, and in general, a vacuum circuit breaker is accommodated within a cradle fixed to a distributing board so as to be used. In a distributing board, a connected position in which a terminal of a circuit breaker is connected to a load terminal of a cradle to supply a voltage and a current and a test position in which the terminal of the circuit breaker is separated from the terminal of the cradle and only an operation of the circuit breaker is tested. In particular, a mechanically operated cell (MOC) switch indicating an ON/OFF state of a circuit breaker operation, so that when a vacuum circuit breaker is in the test position, operations (closing and opening (trip) operations) thereof is tested or checked, and when the circuit beaker is in the connected position, peripherals are operated or interlocking is implemented by using a contact output (ON or OFF) of the MOC switch to secure stability of the circuit breaker operation.

In other words, when the vacuum circuit breaker performs an ON/OFF operation in the connected position, the MOC switch is associated with the operation of the vacuum circuit breaker to indicate an operational state of the is circuit breaker or send a signal to a peripheral device to perform interlocking, or the like, while to performing an ON/OFF operation.

Referring to the related art illustrated in FIG. 1, the related art MOC switch 1 is installed on a bottom surface of a cradle of a switch box, and when a circuit breaker is in an OFF state, a contact b (present within an auxiliary switch 2 of the MOC switch 1) of the auxiliary switch 2 is closed to indicate that the circuit breaker is in the OFF state. When the circuit breaker is in the OFF state, a push rod 3, which is connected to a body of the circuit breaker and makes a vertical movement, is not in contact with a connection lever 4 as illustrated in FIG. 2. When the circuit breaker is in an ON state, the push rod 3 is moved downwardly to press the connection lever 4 as illustrated in FIG. 3. As the connection lever 4 is rotated to rotate the auxiliary switch 2 by 90 degrees, a contact 'a' within the auxiliary switch 2 is closed, indicating that the circuit breaker is in the ON state.

However, in the case of closing the circuit breaker, when a movement direction of the push rod 3 and the operational direction of the connection lever 4 are the same so an overrun stroke occurs due to an impulsive load during the closing operation, an operation stroke of the connection lever 4 may be increased to cause impact with a stop pin 6 to cause the components to be deformed. Conversely, when the stroke of the push rod 3 is short, an MOC contact output is not made, and thus, peripherals, which are supposed to be operated according to the contact output, may not be actuated. Also, when the circuit breaker is closed, sliding friction may be made between the push rod 3 and the connection lever 4 to make a loss of input energy.

SUMMARY OF THE INVENTION

Therefore, an aspect of the detailed description is to provide a mechanically operated cell (MOC) switch of a vacuum circuit breaker, which is uniformly operated regardless of an insertion stroke of a push rod that operates a MOC switch of a vacuum circuit breaker.

To achieve these and other advantages and in accordance with the purpose of this specification, as embodied and broadly described herein, a mechanically operated cell (MOC) switch outputting an ON/OFF state of a vacuum circuit breaker when the vacuum circuit breaker operates, includes: a main bracket; a rotational shaft installed in the main bracket; a connection lever rotatably coupled to the rotational shaft and having one end connected to an auxiliary switch; a roller coupled to the other end of the connection lever; and a horizontal moving unit installed in a portion of the main bracket and making a horizontal movement to rotate the roller and allowing the other end of the connection lever to make an ascending and descending movement.

The MOC switch may further include: a rotating piece disposed between the connection lever and the auxiliary switch and slidably coupled to one end of the connection lever; and an operating switch having one end coupled to the rotating piece.

The horizontal moving unit may include: a support bracket installed in a portion of the main bracket; a horizontal rod installed to penetrate through the support bracket; a moving bar coupled to one end of the horizontal rod; and a return spring installed in a portion of the horizontal rod and generating elastic force when the horizontal rod is moved.

In the case of the MOC switch according to an embodiment of the present invention, since a movement direction of the push rod of the MOC switch and a movement direction of the connection lever of the MOC switch are perpendicular when the circuit breaker operates, the MOC switch can be stably uniformly operated regardless of a sufficient or insufficient stroke of the push rod.

Also, since impact applied to the push rod of the MOC switch by the connection lever is transmitted as rolling frictional contact due to the presence of the roller, friction energy can be minimized to minimize loss of input energy.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
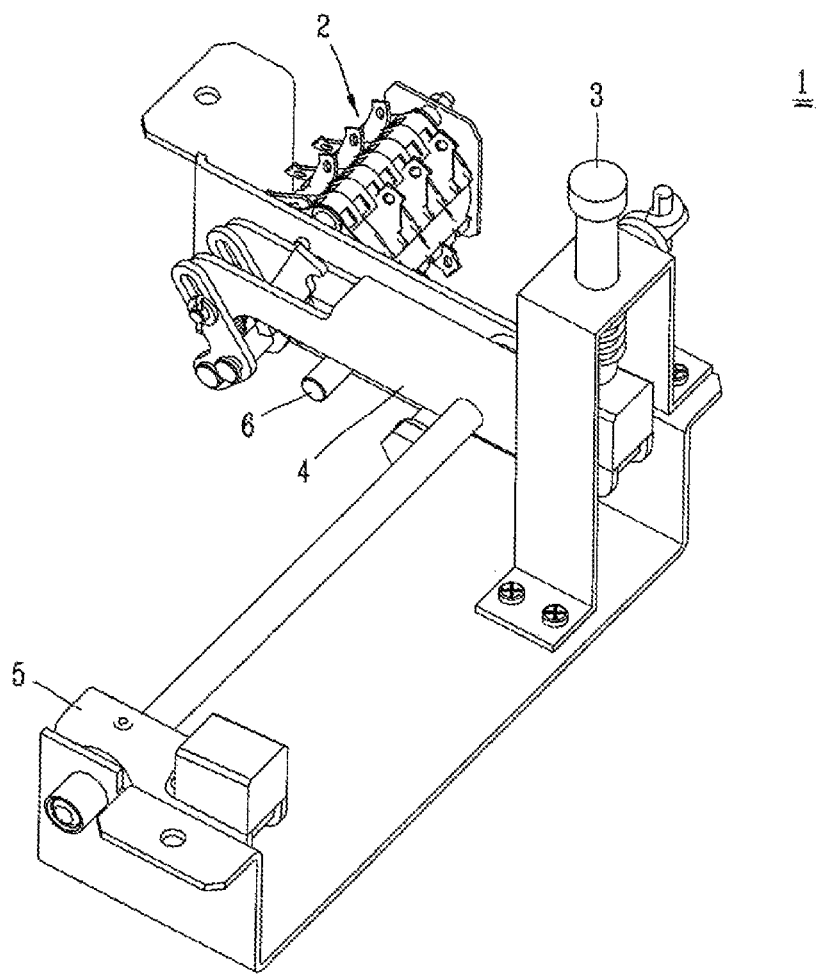
FIG. 1 is a perspective view of the related art mechanically operated cell (MOC) switch.
Figure 2:
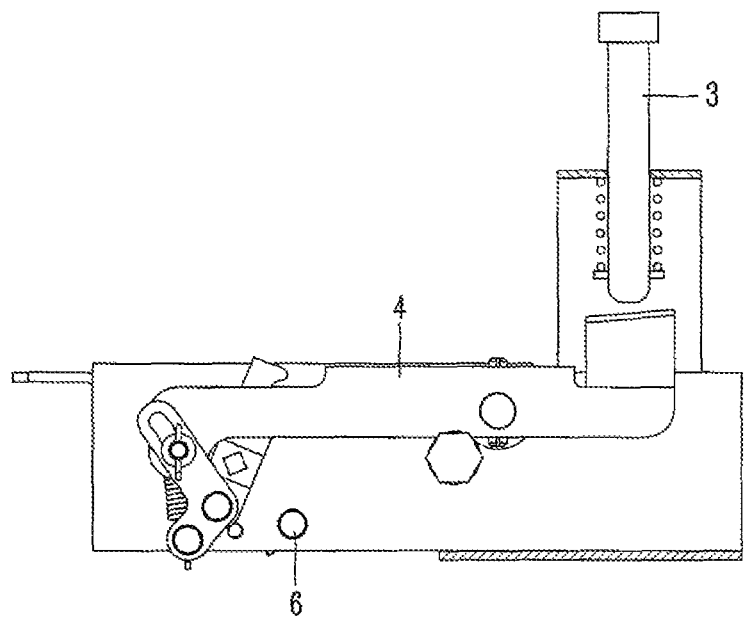
FIG. 2 is a side view illustrating an operational state of the MOC switch of FIG. 1 when a circuit breaker is in an OFF state.
Figure 3:
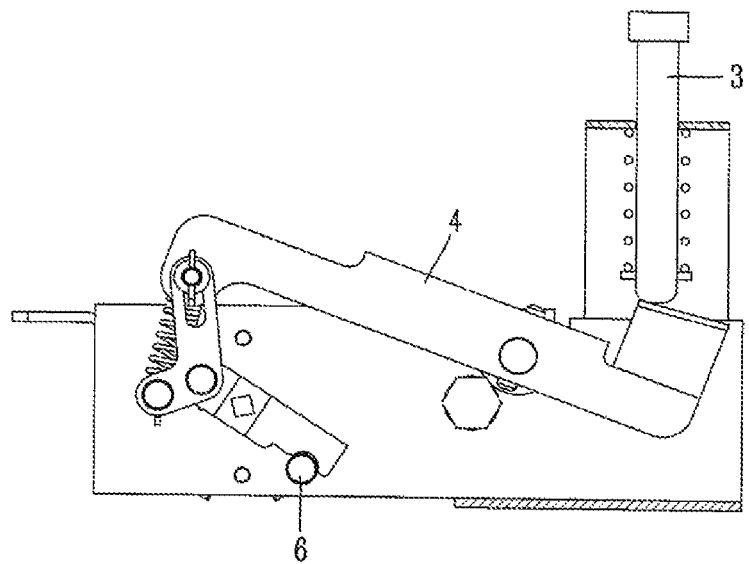
FIG. 3 is a side view illustrating an operational state of the MOC switch of FIG. 1 when the circuit breaker is in an ON state.

Description will now be given in detail of the exemplary embodiments, with reference to the accompanying drawings. For the sake of brief description with reference to the drawings, the same or equivalent components will be provided with the same reference numbers, and description thereof will not be repeated.

A mechanically operated cell (MOC) switch which outputs an ON/OFF state of a vacuum circuit breaker when the vacuum circuit breaker operates according to an embodiment of the present invention includes: a main bracket 10; a rotational shaft 20 installed in the main bracket 10; a connection lever 30 rotatably coupled to the rotational shaft 20 and having one end 31 connected to an auxiliary switch 80; a roller coupled to the other end 32 of the connection lever 30; and a horizontal moving unit installed in a portion of the main bracket 10 and making a horizontal movement to rotate the roller and allowing the other end 32 of is the connection lever 30 to ascend or descend.

Figure 4:
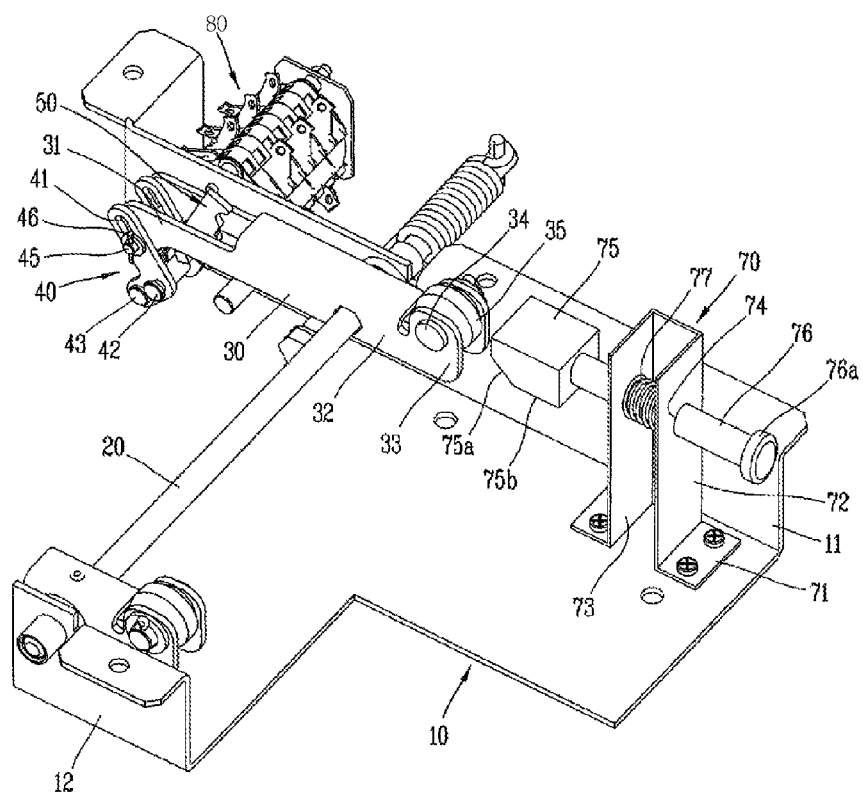
FIG. 4 is a perspective view of a MOC switch according to an embodiment of the present invention.
Figure 5:
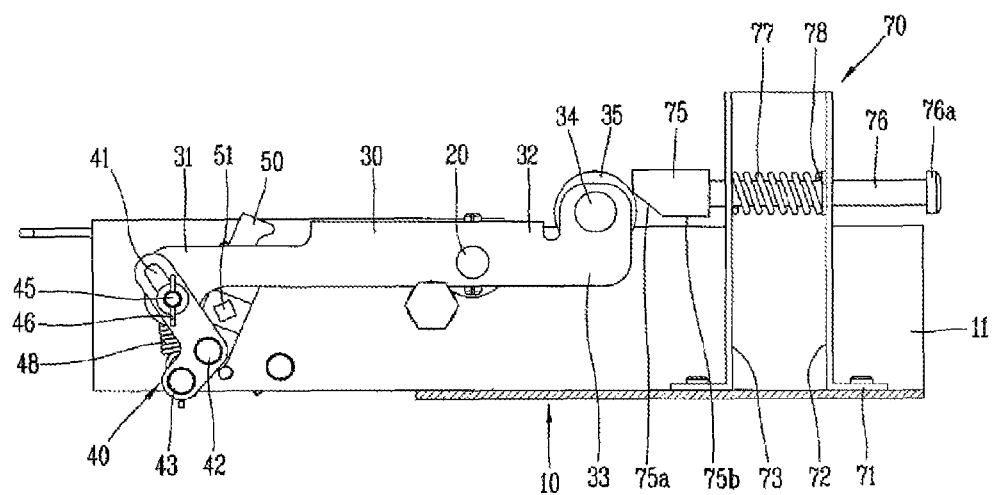
FIG. 5 is a side view illustrating an operational state of the MOC switch of FIG. 4 when a circuit breaker is in an OFF state.
Figure 6:
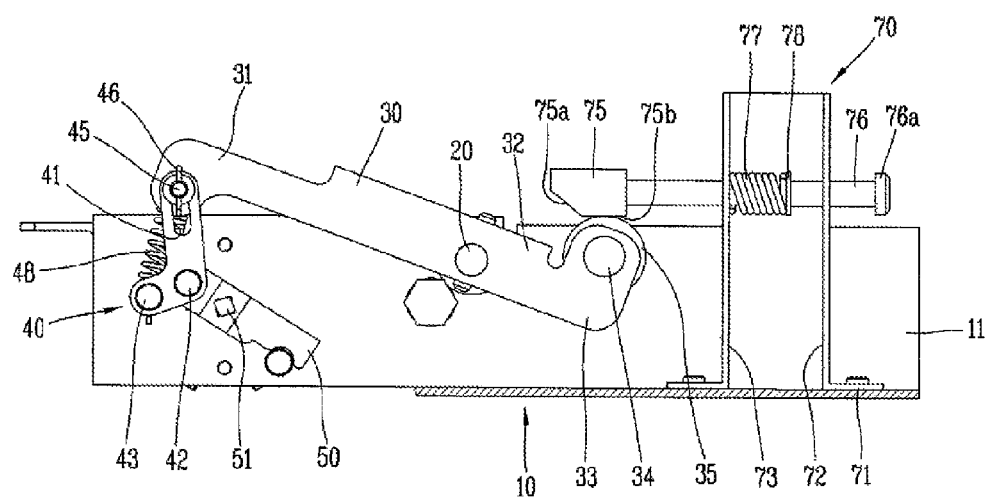
FIG. 6 is a side view illustrating an operational state of the MOC switch of FIG. 4 when the circuit breaker is in an OFF state.

FIG. 4 is a perspective view of a MOC switch according to an embodiment of the present invention, FIG. 5 is a side view illustrating an operational state of the MOC switch of FIG. 4 when a circuit breaker is in an OFF state, and FIG. 6 is a side view illustrating an operational state of the MOC switch of FIG. 4 when the circuit breaker is in an OFF state. The MOC switch of the vacuum circuit breaker according to an embodiment of the present invention will be described in detail with reference to the accompanying drawings.

The main bracket 10 includes a bottom surface and both lateral surfaces 11 and 12 formed on both sides of the bottom surfaces and is installed in a bottom portion of a cradle of a distribution box (or a switch box).

The rotational shaft 20 is coupled to penetrate through the both lateral surfaces 11 and 12 of the main bracket 10.

The connection lever 30 is installed in an inner side of the lateral surface 11 of the main bracket 10 and inserted into the rotational shaft 20. The connection lever 30 may rotate about the rotational shaft 20 (by being centered thereon) in a clockwise direction or a counterclockwise direction.

A rotating piece 40 is formed to have an 'L'-like shape and slidably coupled to one end 31 of the connection lever 30. A sliding recess 41 is formed in one side of the rotating piece 40 and coupled to one end 31 of the connection lever 30 by means of a coupling pin 45 and a coupling key 46. When one end 31 of the connection lever 30 moves up and down, the rotating piece 40 is cooperatively moved by the medium of the coupling pin 45. A first fixing shaft 42 and a second fixing shaft 43 are vertically coupled to the other side of the rotating piece 40 in a penetrating manner. An operating switch 50 as described hereinafter is coupled to the first fixing shaft 42, and a coil spring 48 is coupled between the second fixing shaft 43 and the coupling pin 45. Since the rotating piece 40 is coupled to the connection lever 30 through the sliding recess 41 and the coil spring 48, it is cooperatively moved with flexibility and elasticity of a gap according to a movement of the connection lever 30. Here, the rotating piece 40 is configured as a pair, and the pair of rotating pieces 40 are coupled to both sides of the one end 31 of the connection lever 30. The coupling pin 45, the first fixing shaft, and the second fixing shaft 43 may be coupled between the pair of rotating pieces 40.

The operating switch 50 is coupled to rotate about a rotational shaft 51 vertically coupled to the lateral surface 11 of the main bracket 10. One end of the operating switch 50 is coupled to the first fixing shaft 42 of the rotating piece 40 and moved cooperatively according to a movement of the rotating piece 40. Namely, when the connection lever 30 rotates in a clockwise direction or counterclockwise direction, the one end 31 makes a vertical movement (or moves up and down) and the rotating piece 40 interworks to make a vertical movement, and accordingly, the operating switch 50 whose one end is coupled to the first fixing shaft 42 of the rotating piece 40 is rotated about the rotational shaft 51. As the operating switch 50 makes the rotational movement, a position of a contact within the auxiliary switch 80 coupled to the rotating shaft 51 is changed.

A rotatory member is provided in the other end 32 of the connection lever 30. A roller 35 is illustrated as an example of the rotatory member in FIGS. 4 through 6. A pair of platy stoppage pieces 33 are formed to extend from the other end 32 of the connection lever 30, and a roller 35 is rotatably coupled to a coupling shaft 34 traversing the stoppage pieces 33.

The horizontal moving unit will be described.

A support bracket 70 is installed on the main bracket 10 or the bottom portion of the cradle. The support bracket 70 is installed to stand upright and has a shape of a beam having one surface thereof opened. A lower portion of the support bracket 70 is bent to form horizontal surface 71 and fixed to the main bracket 10 or the bottom portion. Through holes 74 are formed in both lateral surfaces 72 and 73 of the support bracket 70.

A horizontal rod 76 is installed to penetrate through the through holes 74 of the both lateral surfaces 72 and 73 of the support bracket 70. A moving bar 75 may have a rectangular shape and a sloped portion 75a is formed on an outer lower surface thereof. A protrusion 76a may be formed in the other end of the horizontal rod 76. Here, the horizontal rod 76 and the protrusion 76a may be integrally formed.

The protrusion 76a is a portion for receiving an input according to an operation of the circuit breaker. When the circuit breaker operates and the protrusion 76a is pushed, the moving bar 75 coupled to one end of the horizontal rod 76 is moved to the left and the sloped portion 75a of the moving bar 75 rotates the roller 35 of the connection lever 30 to make the other end 32 of the connection lever descend. When the other end 32 of the connection lever 30 descends on the basis of the rotational shaft 20, the other end 32 of the connection lever 30 is smoothly moved due to a rolling movement of the roller 35 with respect to the sloped portion 75a. Also, since a horizontal stroke (or a horizontal movement) of the moving bar 75 is formed extendedly, although overrun occurs, the lower surface 75b of the moving bar 75 formed as a horizontal surfaces simply rotates the roller 35, without applying unnecessary force to the connection lever 30. Namely, the other end 32 of the connection lever 30 uniformly descends to the lower surface 75b of the moving bar 75.

A return spring 77 is inserted into a portion of the horizontal rod 76. Namely, in the horizontal rod 76 in a state in which the circuit breaker does not operate, the return spring 77 is insertedly installed in a portion of the horizontal rod 76 which belongs to the interior of the support bracket 70. One end of the return spring 77 is caught by one lateral surface 73 of the support bracket 70 and the other end of the return spring 77 is caught by a fixing key 78 coupled to a portion of the horizontal rod 76. When the horizontal rod 76 is moved to the left, the other end portion of the return spring 77 is pushed by the fixing key 78, and thus, the return spring 77 is compressed. When the circuit breaker operates and the protrusion 76a is pushed to the left, the horizontal rod 76 is moved to the left and the return spring 77 is caught to the lateral surface 73 of the support bracket 70 to receive elastic force, and when the circuit breaker is released to remove force pushing the protrusion 76a, the horizontal rod 76 is returned to its original position due to the elastic force. According to the horizontal movement of the horizontal rod 76, the other end 32 of the connection lever 30 in contact with the sloped portion 75a of the moving bar 75 ascends or descends by the medium of the rotational movement of the roller 35.

Figure 7:
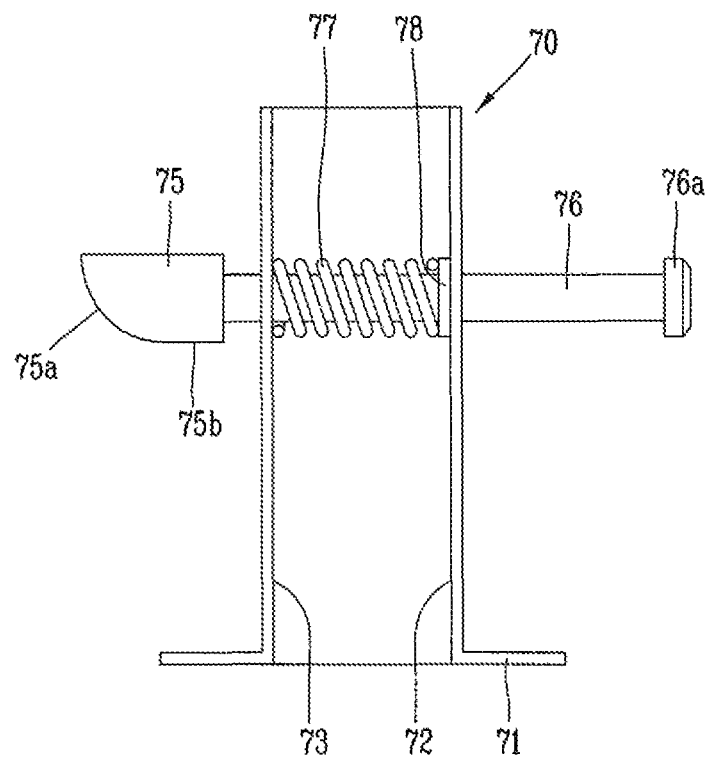
FIG. 7 is a front view of a horizontal moving unit according to another embodiment of the present invention.

FIG. 7 is a front view of a horizontal moving unit according to another embodiment of the present invention. The horizontal moving unit according to another embodiment of the present invention is the same as that of the foregoing example, except that the sloped portion 75a of the moving bar 75 has a smooth arc shape. Since force transmitted to the other end 32 of the connection lever 30 is not rapidly changed when the horizontal rod 75 is moved, an ascending and is descending movement of the other end 32 of the connection lever 30 can be smoothly performed.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mechanically operated cell (MOC) switch outputting an ON/OFF state of a vacuum circuit breaker when the vacuum circuit breaker operates, the MOC switch comprising:
    a main bracket;
    a rotational shaft installed in the main bracket;
    a connection lever rotatably coupled to the rotational shaft and having a first end connected to an auxiliary switch;
    a roller coupled to a second end of the connection lever; and
    a horizontal moving unit installed in a portion of the main bracket and including a moving bar that moves horizontally such that the moving bar rotates the roller and causes the second end of the connection lever to ascend and descend perpendicularly.

2. The MOC switch of claim 1, further comprising:
    a rotating piece located between the connection lever and the auxiliary switch and slidably coupled to the first end of the connection lever; and
    an operating switch having one end coupled to the rotating piece.

3. The MOC switch of claim 2, wherein the horizontal moving unit further includes:
    a support bracket installed in a portion of the main bracket;
    a horizontal rod that penetrates the support bracket; and
    a return spring installed in a portion of the horizontal rod and generating elastic force when the horizontal rod is moved.

4. The MOC switch of claim 3, wherein a lower surface of the moving bar is formed as a horizontal surface.

5. The MOC switch of claim 4, wherein an outer lower surface of the moving bar has a sloped portion to allow the second end of the connection lever to descend while rotating the roller.

6. The MOC switch of claim 5, wherein the sloped portion has a smooth arc shape.

* * * * *